(12) United States Patent
Lesche

(10) Patent No.: US 7,607,562 B2
(45) Date of Patent: Oct. 27, 2009

(54) TOOL ASSEMBLY HEAT TREATMENT METHOD

(76) Inventor: Peter W. Lesche, 1220 Grissel Dr., Millville, NJ (US) 08332

( * ) Notice: Subject to any disclaimer, the term of this patent is extended or adjusted under 35 U.S.C. 154(b) by 0 days.

(21) Appl. No.: 12/072,528

(22) Filed: Feb. 27, 2008

(65) Prior Publication Data

US 2009/0084830 A1 Apr. 2, 2009

Related U.S. Application Data

(60) Provisional application No. 60/997,286, filed on Oct. 2, 2007.

(51) Int. Cl.
*B23K 28/00* (2006.01)
*B23K 101/20* (2006.01)

(52) U.S. Cl. .................. 228/231; 76/DIG. 5; 76/101.1; 148/519; 148/521; 148/528; 29/525.14; 29/428

(58) Field of Classification Search ................ 228/231; 76/DIG. 5, 101.1; 148/519, 521, 528; 29/525.14, 29/428

See application file for complete search history.

(56) References Cited

U.S. PATENT DOCUMENTS 2,065,898 A * 12/1936 Kreag .................. 175/420.1
2,290,552 A * 7/1942 Gier, Jr. .................. 266/255

* cited by examiner

*Primary Examiner*—Kevin P Kerns
*Assistant Examiner*—Erin B Saad
(74) *Attorney, Agent, or Firm*—Stuart M. Goldstein

(57) ABSTRACT

A method of welding connection is directed towards the construction and subsequent heat treatment of industrial grade manual tools and, specifically, their tool heads to handles or handle attachment connections. The method employs the use of matching, non-heat treated, compatible material such as steel alloys, for the tool heads and steel handles or attachment sockets. These components are welded together prior to their heat treatment, resulting in a superior weld joint without the normal annealing which occurs during welding. Such tools are, as a result, extremely resistant to bending or breaking under normal usage. With regard to spades and shovels, a stronger blade-to-handle junction is created, as no annealing takes place, compared to blades and handles which are first heat treated separately then welded together.

4 Claims, 3 Drawing Sheets

TOOL ASSEMBLY HEAT TREATMENT METHOD

This application claims the benefit of provisional application Ser. No. 60/997,286, filed on Oct. 2, 2007.

BACKGROUND OF THE INVENTION

The invention relates to the assembly and everyday use of spades, shovels, rakes, forks and other hand tools designed for heavy hand field labor, suited for gardeners, landscapers, nurserymen, hardscapers, contractors, road builders, farmers and like workers. The typical tools that have been in use for many years have a handle made of either wood or fiberglass, attached to the tool head through the use of a metal fitting or tube. The juncture of the fitting to the tool head is never fully tested, as it relates to strength, since the handles routinely are the components which break first. When breakage occurs, there is a real possibility of serious injury to the user of the tool.

In recent years, the advent of all steel handles has replaced wood and fiberglass assemblies. However, it has been found that under hard usage, especially in industrial applications, the steel handles can bend or the attachment area of the tool head to handle fractures due to the annealing process which takes place during the welding of the handle or handle attachment to the tool head. To date, there has been no tool unit which addresses this problem and no method of tool assembly which creates a tool of superior strength at the handle to tool head connection.

SUMMARY OF THE INVENTION

It is thus an object of the present invention to overcome the disadvantages and limitations of prior tool assembly methods.

It is an object of the present invention to provide a tool assembly method which greatly increases the tool head to tool handle connection.

It is another object of the present invention to provide a tool assembly method which utilizes a non-heated material for the handle or handle attachment of the tool assembly which is weld compatible with the tool head and which, after welding, creates a single integral tool assembly which is heat treated as one common unit.

It is a further object of the present invention to provide a tool assembly method which utilizes an alloy steel for the handle of the handle or handle attachment of the tool which is weld compatible with the alloy steel of the tool head and which, after welding attachment and subsequent heat treatment, creates a simple tool which can be used in highly, tool-stressed work environments.

These and other objects are accomplished by the present invention, a method of tool head to tool handle assembly which provides for the welding of tool handles made of non-heat treated, weld compatible, steel alloy or equivalent material, to tool heads made of the same material. Only after the welding operation is completed, and a single, integral tool assembly is fashioned, is the entire assembly heat treated. This greatly increases the strength of the weld joint between the handle and head and, hence increases the strength of the overall tool.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

The method of the subject invention is directed towards the construction and subsequent heat treatment of industrial grade manual tools and, specifically, their tool head to handle or handle attachment connections. The method is directed to the use of matching, non-heat treated, compatible material such as steel alloys, for the tool heads and steel handles or attachment sockets. These components are welded together prior to their heat treatment, resulting in a superior weld joint without the normal annealing which occurs during welding. Such tools are, as a result, extremely resistant to bending or breaking under normal usage. With regard to spades and shovels, a stronger blade-to-handle junction is created, as no annealing takes place, compared to blades and handles which are first heat treated separately then welded together.

Figure 1:
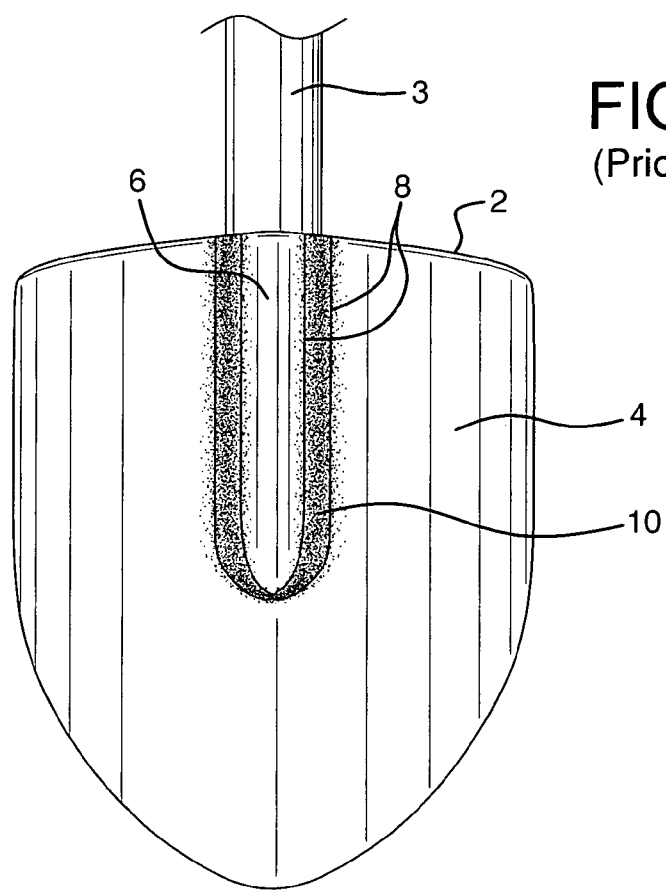
FIG. 1 shows a tool head to tool handle connection in accordance with the prior art assembly technique.

FIG. 1 illustrates tool handle 3 and back side 4 of spade blade 2 that has had the end of the handle or a handle attachment 6 welded to its face after the blade had been heat treated, in accordance with customary practice. This type of weld connection results in annealing bands 8 forming on back side 4 around the shape 10 of the weld. Annealing will eventually lead to failure of the blade, during high stress use, where the two annealing bands meet. In certain light duty applications, this method of construction is acceptable, even if the tool was abused. However, in an industrial, intense use setting, these annealing bands would eventually lead to blade failure.

It is noted that in attempting to lessen the annealing effect in this type of connection, the welder will routinely use less power for the entire weld and a smaller bead at the tip of the handle. This results in less weld at the most critical point of the connection and also serves to decrease the weld strength.

Figure 2:
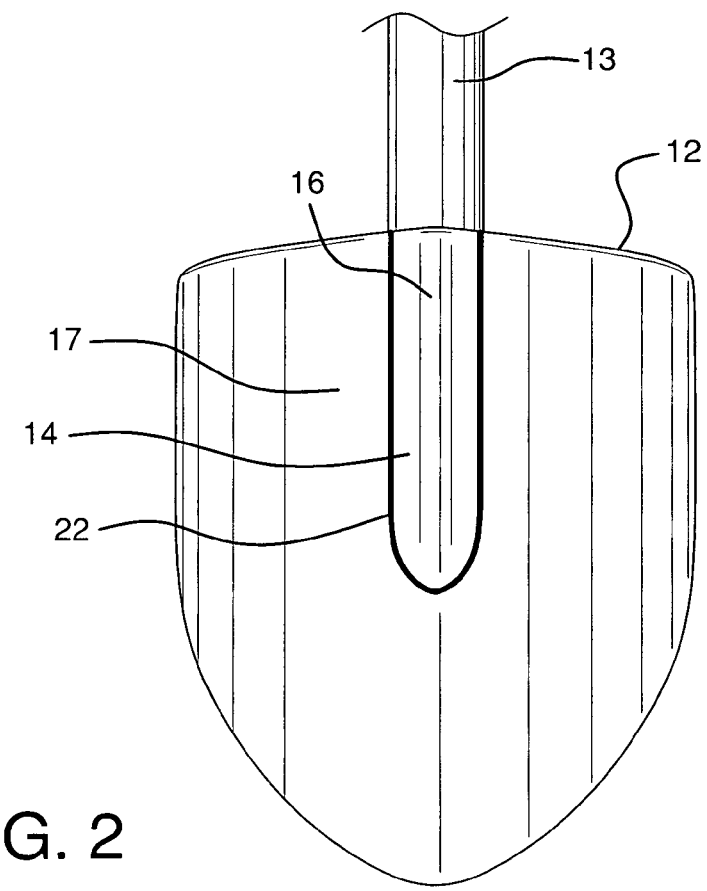
FIG. 2 shows a tool head to tool handle assembly completed in accordance with the method of the present invention.
Figure 3:
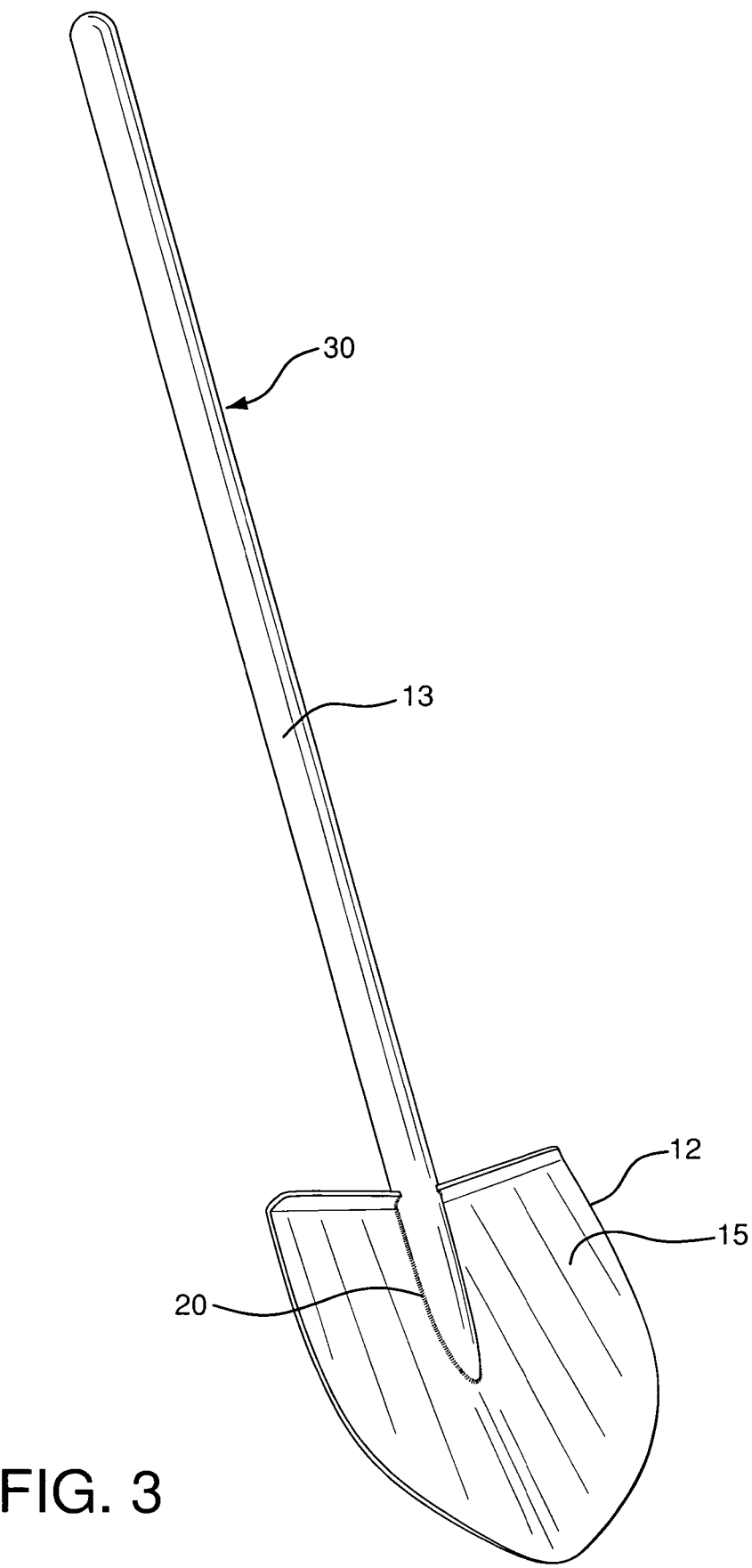
FIG. 3 is an isometric view of an integral tool assembly constructed in accordance with the method of the present invention, showing the face of the tool head.
Figure 4:
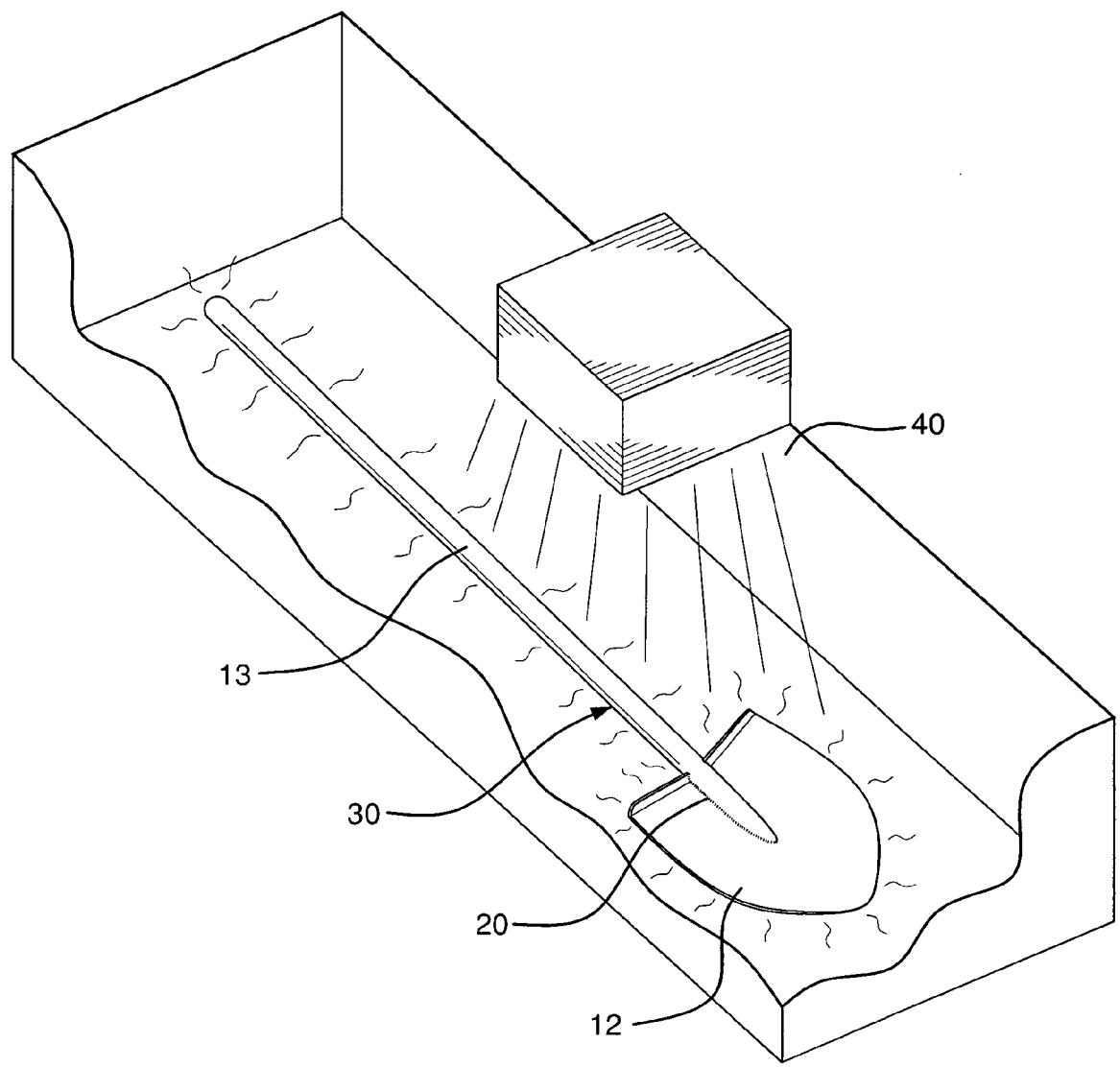
FIG. 4 is an illustration of the heat treatment of the entire integral tool assembly as a common unit, in accordance with the present invention.

The method of the present invention, on the other hand, results in a tool unit which has increased strength of the weld joint between the handle and the head and, as a result, the strength of the overall tool is increased. In accordance with the invention, a tool head, or as shown in FIG. 2, spade blade 12, is made of a non-heat treated, weld compatible steel alloy or equivalent material, and a tool handle 13 or its end 14 or a handle attachment 16 is made of the same material. Elongated end 14 or attachment 16 is then welded to front face 15 of blade 12, by standard welding technique, to form weld joint 20 between the handle 13 and blade or head 12. See FIG. 3. This creates the integral tool assembly 30 which is then ready for heat treatment. Tool assembly 30 is then heat treated, in its entirety as a single unit, within a concentrated heat source 40, as depicted in FIG. 4, or, alternatively, by the use of induction heating or equivalent common heat treating practices. The heat source could be a quench fixture or any equivalent enclosure capable of generating temperatures of between 1500° F.

and 2000° F. This temperature range is not to be considered restrictive to the range of temperatures which may be employed.

It is noted that tool assembly 30 need not be heat treated in its entirety. It can be heat treated only for a partial distance along handle 13, through weld joint 20 to the end of blade 12.

The resulting tool head 12 to tool handle 13 weld joint produces a bond with greatly increased strength over that which is heat treated prior to welding. FIG. 2 shows back side 17 of tool head 12 and its handle 13, joined in accordance with the invention. The weld juncture 22 is concentrated and clearly depicted. There are no annealing bands around the weld zone. FIG. 3, showing the face of tool head 12 connected to handle 13, also shows the application of substantial concentrated weld material 20 with no annealing bands.

The tool head to tool handle method of fabrication as described herein produces a tool which may be used for high stress jobs, with little fear of bending or breakage between the welded components. The increased strength afforded to such tools represents a major improvement over prior fabrication techniques.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. The method of attaching a tool head to a tool handle comprising the steps of:
   providing a tool head-made of non-heat treated, weld compatible material;
   providing a tool handle with an elongated end made of the same non-heat treated, weld compatible material as the tool head;
   welding the elongated end of the tool handle to the tool head, forming a weld joint between handle and head;
   creating an integral tool assembly; and
   only after creating said integral tool assembly, heat treating at least a portion of the tool assembly as a single unit, producing a concentrated weld joint free from annealing bands which results in increased strength of the weld joint.

2. The method as in claim 1 comprising the further step of heat treating the entire tool assembly.

3. The method as in claim 1 wherein the portion of the tool assembly comprises a partial distance along the tool handle, the entire weld joint and the entire length of the tool head.

4. The method as in claim 1 comprising the further step of heat treating the said portion of the tool assembly to a temperature in the 1500° F. to 2000° F. range.

* * * * *